United States Patent [19]

Naitou et al.

[11] Patent Number: 4,907,155
[45] Date of Patent: Mar. 6, 1990

[54] CONSTANT SPEED CONTROL DEVICE FOR VEHICLE

[75] Inventors: Yasuo Naitou; Akihiko Mori, both of Hyogo; Mamoru Hayama, Hiroshima, all of Japan

[73] Assignees: Mitsubishi Denki Kabushiki Kaisha, Tokyo; Mazda Motor Corporation, Hiroshima, both of Japan

[21] Appl. No.: 184,555
[22] PCT Filed: Aug. 19, 1987
[86] PCT No.: PCT/JP87/00616
§ 371 Date: Jun. 7, 1988
§ 102(e) Date: Jun. 7, 1988

[30] Foreign Application Priority Data

Aug. 20, 1986 [JP] Japan ............................. 61-196001

[51] Int. Cl.$^4$ .............................................. B60K 31/04
[52] U.S. Cl. ................................ 364/426.04; 180/179; 123/352
[58] Field of Search ...................... 364/426.04, 431.07; 123/352; 180/176, 179

[56] References Cited

U.S. PATENT DOCUMENTS

| | | | |
|---|---|---|---|
| 4,196,466 | 4/1980 | Noddings et al. | 123/352 |
| 4,359,124 | 11/1982 | Ninoyu et al. | 180/176 |
| 4,677,560 | 6/1987 | Cao et al. | 364/426.04 |
| 4,735,273 | 4/1988 | Naitou | 180/179 |

Primary Examiner—Gary Chin
Attorney, Agent, or Firm—Sughrue, Mion, Zinn, Macpeak & Seas

[57] ABSTRACT

A constant speed running control device for automatically holding a vehicle speed constant makes a response of an aimed speed setting signal delayed to the order of that of a vehicle speed meter indication by making a smoothening characteristics of the aimed speed setting signal different from that of a running speed signal so that the running speed is made substantially coincident with an aimed speed desired by a vehicle operator.

9 Claims, 6 Drawing Sheets

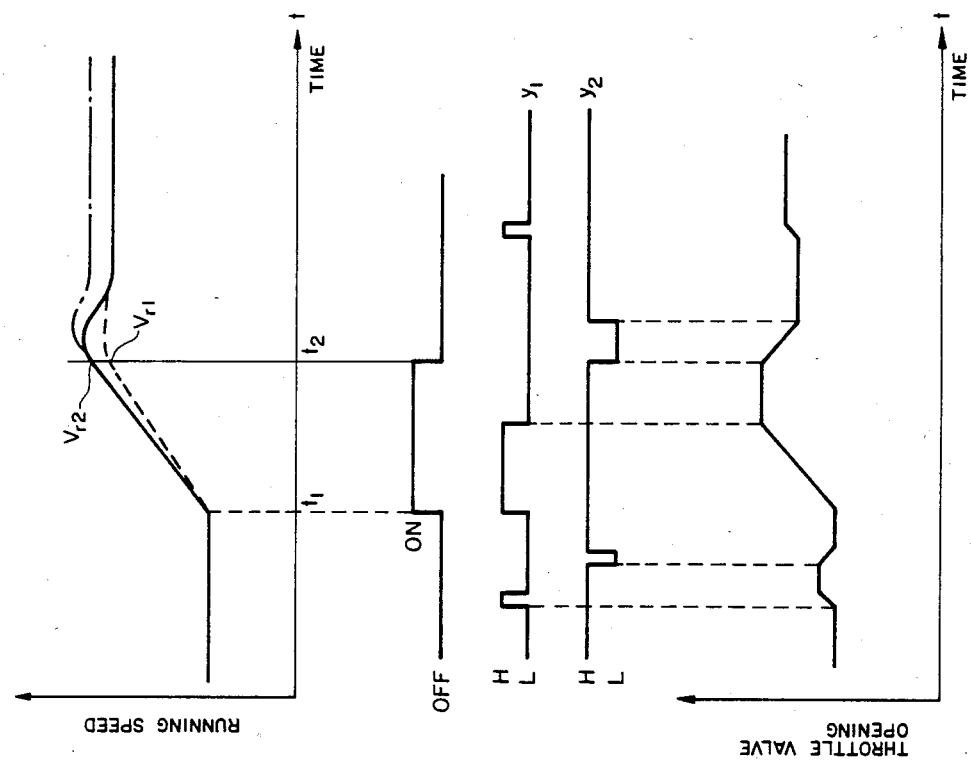

CONSTANT SPEED CONTROL DEVICE FOR VEHICLE

FIELD OF TECHNOLOGY

The present invention relates to a constant speed control device for a vehicle for automatically holding a running speed of the vehicle at a constant value.

BACKGROUND ART

An example of known constant speed control device for a vehicle is shown in FIG. 1. That is, FIG. 1 shows a conventional constant speed control device disclosed in, for example, Japanese Patent Application Laid-open No. 39811/1983, in which 1 depicts a set switch responsive to an operation of a vehicle operator to start a constant speed running, 2 a cancelling switch responsive to an actuation of a braking device (not shown) to terminate the constant speed running and 3 a speed sensor for detecting a running speed of the vehicle, which comprises a rotary member 3a having four magnetic poles and adapted to be rotated by a meter cable (not shown) for transmitting rotation of a vehicle transmission (not shown) and a reed switch 3b and produces a series of pulses having a frequency proportional to a running speed. 4 depicts a vehicle mounted battery, 5 a main switch which is a power source switch for supplying electric power from the battery 4, and 6 a control device having a processing circuit 6a including a microcomputer etc. and is supplied with electric power by closing the main switch 5. The control device is responsive to signals from the set switch 1, the cancelling switch 2 and the speed sensor 3 to perform various operations necessary to automatically equalize an actual running speed Vs to an aimed speed Vr and to output various control signals. 7 depicts a motor-driven throttle actuator responsive to the various control signals from the control device 6, 8 a suction passage of an engine and 9 a throttle valve provided in the suction passage 8 and ganged with an acceleration pedal (not shown). The throttle valve is driven in open and close directions by a link 7a and a wire 7b of the throttle actuator 7. A rotation angle of the link 7a corresponding to the degree of opening of the throttle valve 9 is detected by a potentiometer (not shown) housed therein and given to the control device 6 as a signal indicative of a throttle position. The link 7a and a motor for driving the throttle actuator are connected to each other by an electromagnetic clutch (not shown and disconnected from each other by an electromagnetic clutch signal from the control device 6.

In operation, when the main switch 1 is closed by the vehicle operator and electric power is supplied from the battery 4, the control device 6 commences its operation to process an output of the speed sensor 3 which is a series of pulses having a frequency proportional to the vehicle speed V. The control device 6 measures a pulse period of the output of the speed sensor 3 to obtain an actual speed Vs. The operator operates the set switch 1 to supply the speed signal to the control device 6 which stores the value Vs as the aimed speed Vr and commences a constant speed control.

Thereafter, the control device 6 compares the aimed speed Vr with the actual speed Vs obtained from time to time and provides a control signal with which the throttle actuator 7 is driven to regulate the opening of the throttle valve 9 to thereby make the actual vehicle speed coincident with the aimed speed Vr. That is, when the actual speed Vs is lower than the aimed speed Vr, the control device 6 provides a throttle open signal to drive the throttle valve to a desired position and, when the actual speed Vs is higher than the aimed speed Vr, provides a throttle close signal to close the valve 9 suitably. Thus, it is possible to make the vehicle speed constant without an acceleration pedal operation by the operator. When the operator actuates the brake device while such constant speed control is performed, the cancelling switch 2 is actuated to supply a termination signal to the control device 6 for terminating the constant speed control. Upon the termination signal, the control device 6 provides a disconnection signal for disconnecting the electromagnetic clutch, immediately, upon which the throttle actuator 7 disconnects the electromagnetic clutch. Thereafter, the operator is allowed to control the vehicle speed by regulating the throttle opening by means of the acceleration pedal.

In the conventional constant speed control device constructed as above, when the set switch 1 is operated to make the vehicle speed constant, the speed signal obtained by the control device 6 on the basis of the output of the sensor 3 is not coincident with a value indicated on a speed meter mounted on the vehicle. The reason for this is that the speed signal which is used to perform the constant speed control must be highly responsive to the vehicle speed while the response of the speed meter is intensively lowered since, otherwise, a vibration of indicator needle occurs which is uncomfortable for the operator. Therefore, the vehicle may run at a speed other than that set by the operator according to an indication on the speed meter. Particularly, an aimed speed tends to be much different from that indicated on the speed meter after an automatic acceleration or deceleration is performed by means of switches etc. other than the acceleration pedal during running at a constant speed.

SUMMARY OF THE INVENTION

The present invention was made to solve these problems and an object of the present invention is to provide a constant speed control device which minimizes a difference between an aimed speed and a speed indication of a vehicle mounted speed meter, and therefore make the vehicle possible to run at a desired speed.

The constant speed control device for a vehicle according to the present invention comprises an aimed speed signal generator which receives a speed signal and produces, in addition to a first smoothened speed signal to be used for a control, a second smoothened speed signal by passing the speed signal through a second smoothing means having a smoothing characteristics of the same level as that of a speed meter indication, when an aimed speed setting signal is inputted. With such scheme of the present invention, it is possible to make an aimed speed desired by an operator substantially coincident with a control speed since the aimed speed setting signal generator provides a speed similar to an indication of the speed meter of the vehicle.

BRIEF DESCRIPTION OF THE DRAWINGS

FIG. 2 shows a block diagram of the present invention and FIGS. 3 to 6 show, an embodiment of the present invention, in which FIG. 3 is an overall construction thereof, FIGS. 4(a)-(c) are flow charts showing the operations of a microcomputer used in FIG. 3, FIG. 5 is an output waveform of a speed sensor used in FIG. 3 and FIG. 6 is a time chart showing a running speed, an aimed speed, control signals $y_1$ and $y_2$ and an operation of a throttle valve.

BEST MODE FOR PRACTICING THE PRESENT INVENTION

The present invention will be described in detail with reference to the drawings.

Figure 2:
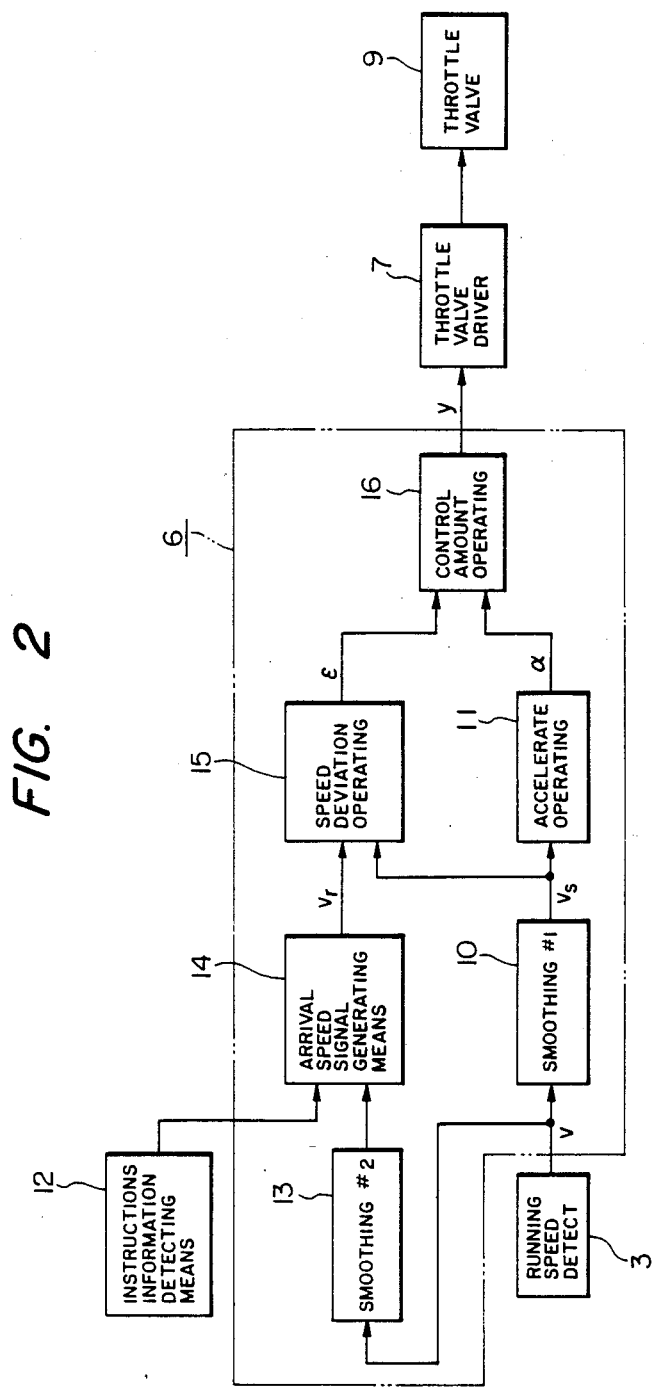

FIG. 2 shows a block diagram of the present invention, in which 3 depicts a running speed detection means for detecting a running speed of a vehicle, 10 a first smoothening means for smoothing a running speed signal V and reducing noise component thereof, 11 an acceleration operating means for obtaining an acceleration signal $\alpha$ from a smoothened running speed signal Vs every predetermined time, 12 an instruction information detection means for detecting an instruction information of an operator, 13 a second smoothing means having a smoothing characteristics similar to a speed meter indication for smoothing the running speed signal, 14 an aimed speed setting signal generator for setting the running speed signal passed through the second smoothing means as an aimed speed signal Vr when the instruction information signal is supplied, 15 a speed deviation operating means for outputting a speed deviation signal $\epsilon$ from the aimed speed signal Vr and the smoothened running speed signal Vs and 16 a control amount outputting means for operating a control signal y from the speed deviation signal $\epsilon$ and the acceleration signal $\alpha$. The control amount operating means 16 actuates a throttle valve driving means 7 serving as a control means for controlling a driving force of the vehicle on the basis of the control signal y to drive a throttle valve 9 to regulate an engine output power. In this manner, it becomes possible to run the vehicle at a constant speed substantially equal to an indicated speed on the speed meter by setting the aimed speed Vr by using the speed signal passed through the second smoothing means having substantially the same smoothing characteristics as that of the speed meter when the running mode is shifted to the constant speed mode.

Figure 1:
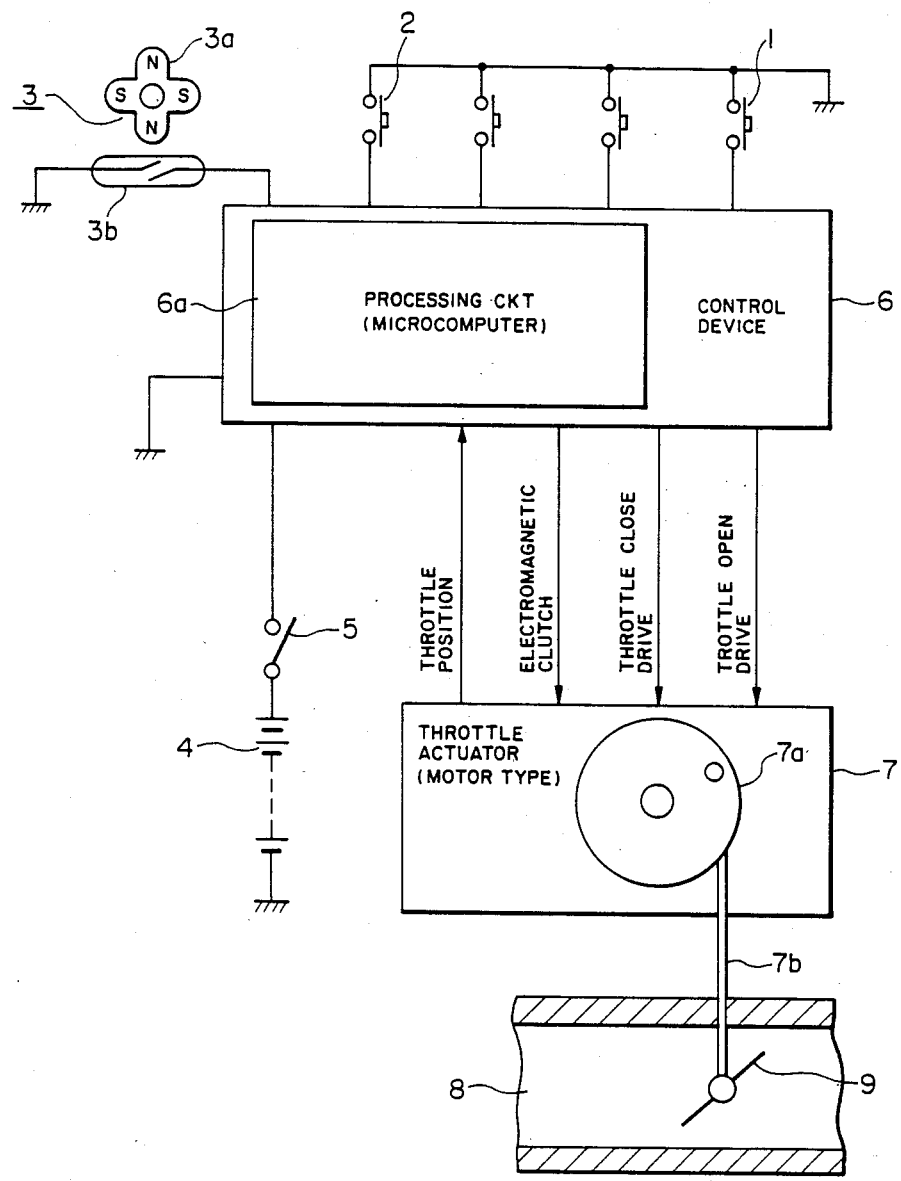
FIG. 1 shows an overall construction of a conventional constant speed control device.
Figure 3:
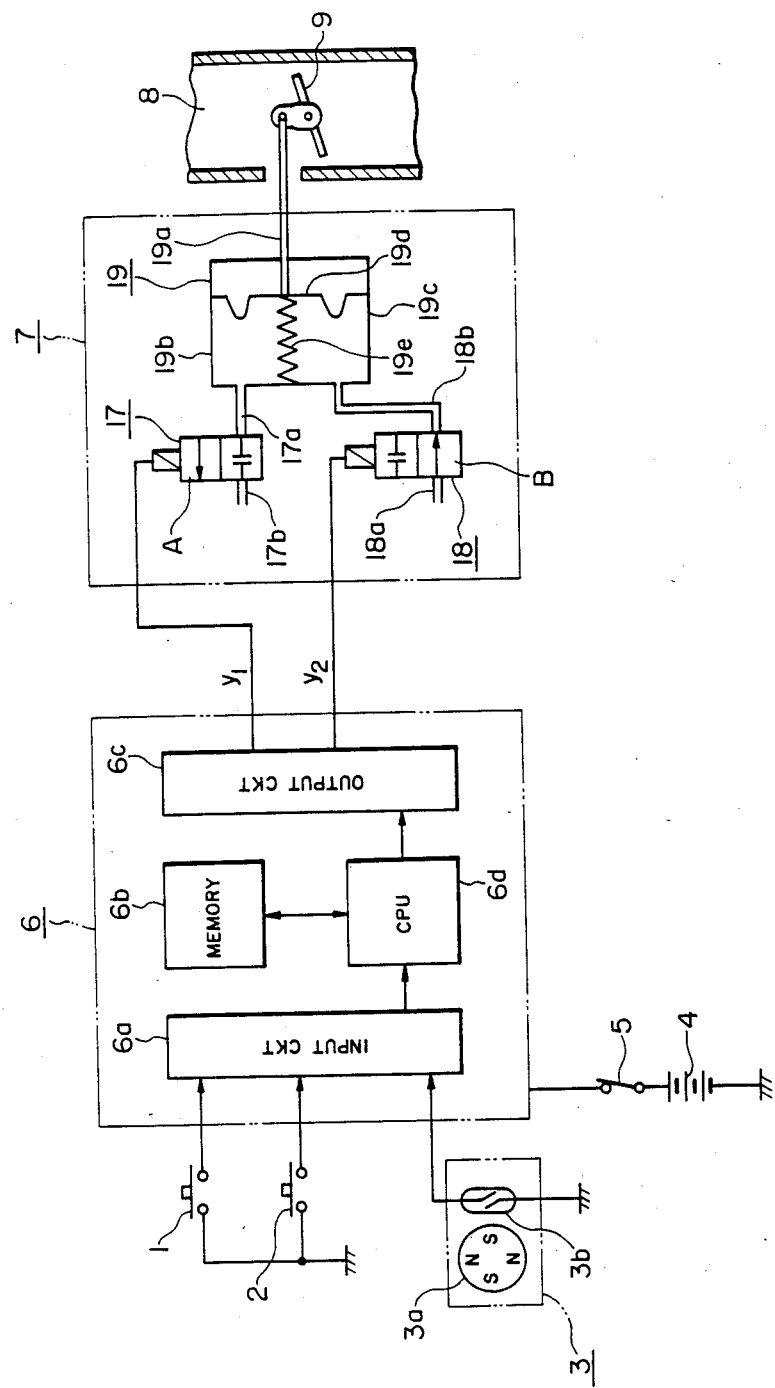

Concrete embodiments of the present invention will be described with reference to FIGS. 3 to 6. In FIG. 3 in which same reference numerals as those used in FIG. 1 depict same components, respectively, a running speed detecting means 3 corresponds to the speed sensor 3 and an instruction information detecting means 12 corresponds to the set switch 1 and the cancelling switch 2. A control device 6 comprises a microcomputer (FIG. 3) constructed with a first smoothing means 10, an acceleration operating means 11, a second smoothing means 13 and a control amount operating means 16 (FIG. 2) and is started to operate upon closure of the main switch 5. The microcomputer includes an input circuit 6a having inputs supplied with signals from the set switch 1, the cancelling switch 2 and the speed sensor 3, a memory 6b including a ROM and a RAM storing command programs, an output circuit 6c providing control signals and a CPU 6d operable according to the command programs in the memory 6b to process the signals from the input circuit 6a and provide an output to the output circuit 6c. 17 depicts an electromagnetic valve to be controlled by a control signal $y_1$ of the microcomputer 6 such that an output tube 17a connected to a negative pressure source (not shown) is connected to an input tube 17a when the control signal $y_1$ is "H" level as shown by an arrow A and is disconnected therefrom when it is "L" level. 18 is another electromagnetic valve to be controlled by a control signal $y_2$ such that an input tube 18a opened to atmosphere is connected to an output tube 18b as shown by an arrow B when the control signal $y_2$ is "L" level and is disconnected therefrom when it is "H" level. 19 is a diaphram device connected to the input tube 17a of the electromagnetic valve 17 and to the output tube 18b of the electromagnetic valve 18 for driving a throttle valve 9 through a wire 19a, which includes a container 19c forming an air chamber 19b connected to the input tube 17a and the ouput tube 18b, a diaphram 19d mounting the wire 19a thereon and a spring 19e disposed between the diaphram 19d and the container 19c for biasing the diaphram 19d in the shown direction and constitutes, together with the electromagnetic valves 17 and 18, a throttle valve driving means 7. The throttle valve driving means 7 has three operation modes such as shown in Table 1. When both of the control signals $y_1$ and $y_2$ are "H" level, the elecromagnetic valve 17 is opened and the electromagnetic valve 18 is shut. Therefore, the air chamber 19b is connected to only the negative pressure source, so that the diaphram 19d moves leftwardly and thus the throttle valve 9 is opened to establish an acceleration mode. When both of the control signals $y_1$ and $y_2$ are "L" level indicating a deceleration mode, the electromagnetic valve 17 is shut and the electromagnetic valve is opened. Therefore, the air chamber 19b is opened to atmosphere, so that the diaphram 19d moves rightwardly by means of the spring 19e and thus the throttle valve 9 is closed to decelerate the vehicle. In a holding mode in which the control signal $y_1$ is "L" level and the control signal $y_2$ is "H" level, the electromagnetic valves 17 and 18 are closed, so that the air chamber 19b is not connected to either the negative pressure source or atmosphere and thus the diaphram 19d is held in its position, so that the opening of the throttle valve 9 is also held in its state.

TABLE 1

| operation mode | $y_1$ | $y_2$ | throttle vale |
|---|---|---|---|
| acceleration | H | H | open |
| deceleration | L | L | close |
| holding | L | H | constant |

Figure 4A:
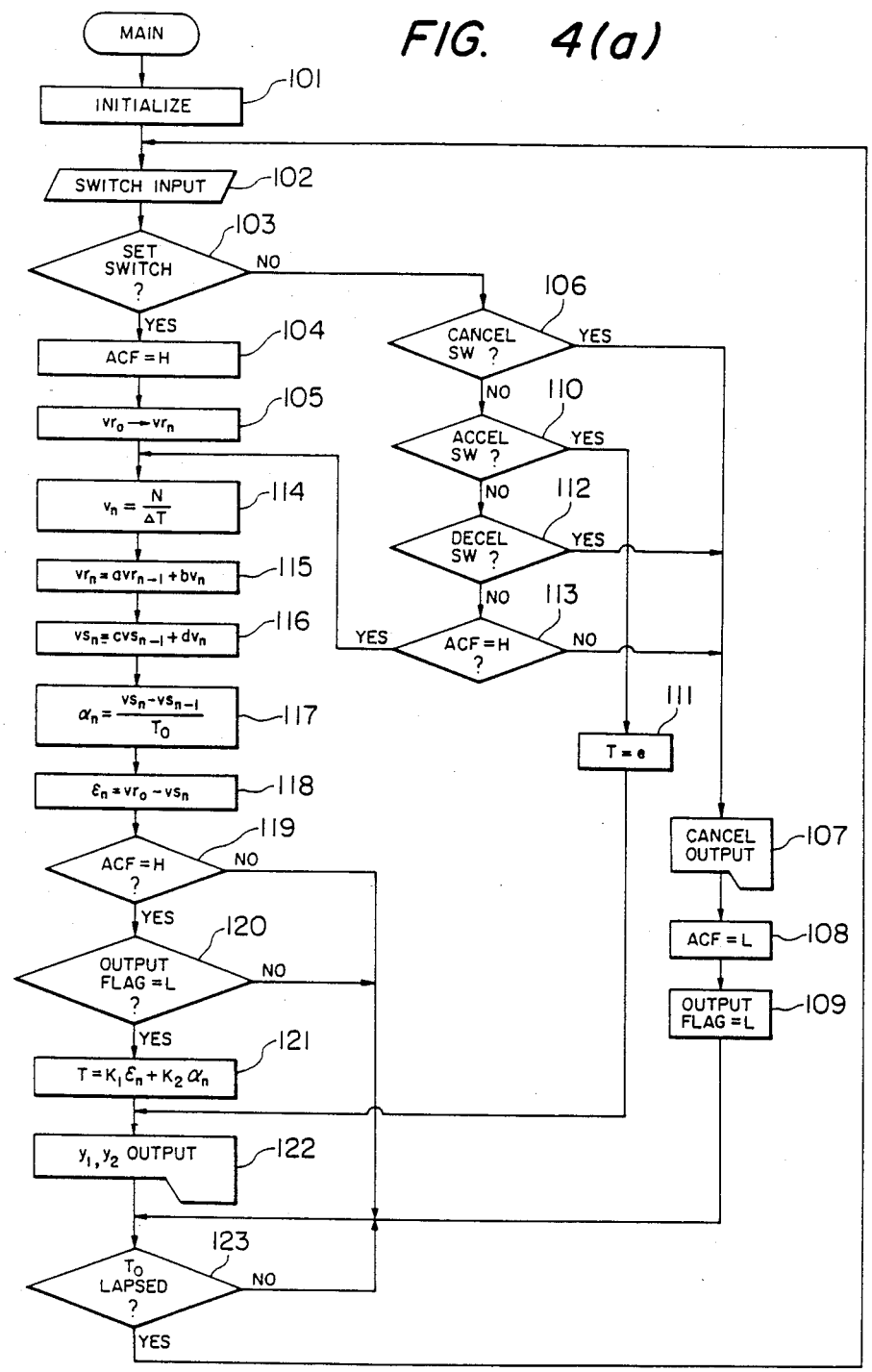
Figure 5:
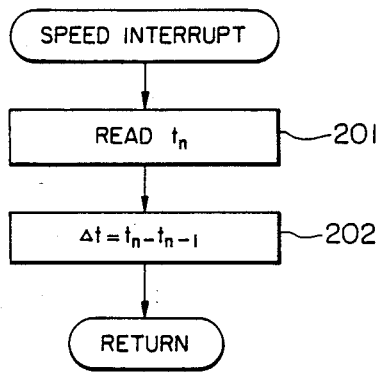
Figure 5:
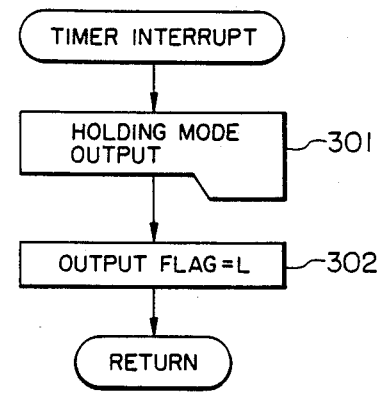
Figure 5:
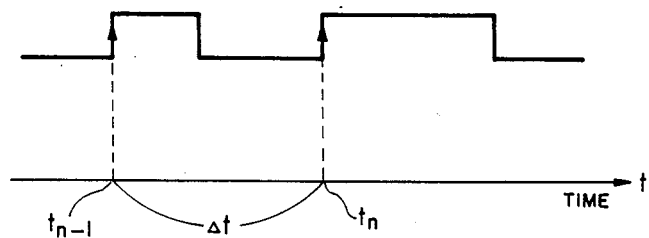

An operation of the embodiment shown in FIG. 3 will be described. Firstly, when the main switch 5 is closed, the microcomputer device 6 starts to execute a main routine shown in FIG. 4a. On the other hand, if the vehicle is running, the speed sensor 3 thereof produces a series of pulses having a frequency proportional to a running speed as shown in FIG. 5, which causes the microcomputer device 6 to perform an interrupt routine processing shown in FIG. 4b. That is, the processing in FIG. 4b is performed at every leading edge of pulse of the pulse signal shown in FIG. 5 by reading a time instance $t_n$ of the leading edge from a timer (not shown) in the step 201 and obtaining a difference $\Delta t$ ($=t_n-t_{n-1}$) between $t_n$ and $t_{n-1}$ at which a leading edge of a preceding pulse is inputted, i.e., a pulse period in the step 202. Thereafter, the operation is returned to the main routine in FIG. 4a. The running speed can be obtained from a reciprocal of the pulse period, as to be described later. Then, when an operator of the vehicle operates, during running, the set switch 1 to start the constant speed running, the microcomputer device 6 receives the fact in step 102 shown in FIG. 4a. When the microcomputer device 6 decides that it is the signal from the set switch 1 in the step 103, it makes a flag ACF "H" indicating the constant speed running, in the step 104.

In the step 105, a signal $Vr_n$ for an aimed speed, which is to be described later, is used for an aimed speed $Vr_o$. On the other hand, in the step 106, it is checked whether or not there is an input from the cancelling switch. If yes, a cancelling operation for cancelling the constant speed control, i.e., a processing to hold both of the control signals $y_1$ and $y_2$ in "L" level, is performed in the step 107. In the step 108, the ACF flag is made "L". In the step 109, a flag indicating existence of the control signal is made "L". In the step 110, it is checked whether or not the switch input information indicates an automatic acceleration. If yes, a predetermined value e is inserted into a control amount T in the step 111. In the step 112, it is checked whether or not it is an automatic deceleration and, in step 113, it is checked whether or not the ACF flag is "H".

In the step 114, a current running speed Vn is obtained from the newest pulse period ΔT which was obtained by the interrupt routine in FIG. 4b, according to the following equation.

$$Vn = \frac{N}{\Delta T}$$

where N is a constant for transformation to speed and n is a current value. In the step 115, the signal Vr for aimed speed is obtained by using a digital filter according to the following equation $$Vr = a \cdot Vr_{n-1} + b \cdot Vn$$

where a and b are constants selected such that a variation indicates subtantially the same order as that indicated by the vehicle speed meter, and n−1 means a preceding value. In the step 116, the running speed Vs is obtained by using a digital filter according to the following equation $$Vs = c \cdot Vs_{n-1} + d \cdot Vn$$

where c and d are constants satisfying c<a and d>b which indicate a low-pass filter characteristics having a cut-off frequency for the running speed Vs higher than that for the signal Vr for the aimed speed. In step 117, an acceleration signal α of the vehicle is obtained by the running speed Vs according to the following equation $$\alpha_n = \frac{Vs_n - Vs_{n-1}}{To}$$

In step 118, a speed deviation signal ε is obtained by the aimed speed Vro and the running speed Vs according to the following equation $$\epsilon_n = Vro - Vs$$

In the step 119, it is checked whether or not the vehicle is in the constant speed running state. If yes (ACF="H"), then it is checked whether or not the control signal exists in the step 120. If the control signal does not exist, an operation of control amount to regulate the opening degree of the throttle valve 9 is performed in the step 121. An example of this operation is to obtain the control amount by using the speed deviation signal ε and the acceleration signal α according to the following equation $$T = k_1 \cdot \epsilon_n + k_2 \cdot \alpha_n$$

where $k_1$ and $k_2$ are constants. With the output time T thus obtained, output levels of the control signals $y_1$ and $y_2$ are obtained from the Table 2 according to the sin of the time T and a timer (not shown) is started, in the step 122. In the step 123, it waits until time To lapses, and, after the time To, it is returned to the step 102 and repeats the respective steps in the same sequence.

TABLE 2

| T | Control Mode | $y_1$ | $y_2$ |
|---|---|---|---|
| positive | acceleration mode | H | H |
| negative | deceleration mode | L | L |
| 0 | holding mode | L | H |

When the control signal is provided in the step 122 and the timer count coincides with the output time T, a timer interrupt routine shown in FIG. 4c is performed. In the step 301, an output level of the holding mode is set and, in the step 302, the control signal flag is made "L" and the operation is returned to the main routine.

In this manner, the acceleration mode output or deceleration mode output of the output time T is supplied from the microcomputer device 6 to the throttle valve driving means 7 and, in the acceleration mode, the air chamber 19b of the diaphram device 19 is shrinked and the diaphram 19d is moved leftwardly thereby to open the throttle valve 9 to a predetermined position. In the deceleration mode, the air chamber 19b is expanded and the diaphram 19d is moved rightwardly thereby to close the throttle valve 9 to a predetermined position. An example of the above mentioned operation is shown in FIG. 6. In this figure, it is assumed that, where the vehicle runs at a desired speed after the automatic acceleration, the running speed Vs is varied as shown by a solid line in FIG. 6a. A dotted line in FIG. 6a shows the running speed obtained by providing the second smoothening characteristics thereto, which is the same as that indicated on the speed meter. FIG. 6b shows an acceleration switch signal for providing an acceleration instruction, and it is assumed that the acceleration signal is provided at a time instance t1 and terminated at a time instance t2 and the vehicle runs at a running speed Vr1 at the time instance t2 thereafter. The control signals $y_1$ and $y_2$ for such running condition become as shown in FIGS. 6c and 6d, respectively. Therefore, the opening degree of the throttle valve is controlled as shown in FIG. 6e. A dotted line in FIG. 6a shows characteristics of the conventional device, in which the aimed speed after acceleration becomes Vr2, as a result, the running speed becomes higher than that the operator desires.

As described, it is possible to run the vehicle at a constant speed equal to the aimed speed by the use of the signal for the aimed speed for setting the aimed speed.

Although, in the described embodiment, the constant opening control in which the throttle valve is opened to the predetermined position when an automatic acceleration has been used, it is possible to use a constant acceleration control. Further, although the digital filter is used to obtain the aimed speed setting signal, it is possible to obtain the signal by using an analog filter. Further, although the throttle valve driving means 7 is constituted with the electromagnetic valves 17 and 18 and the diaphram device 19, it may be replaced by the conventional device using a motor. Further, the acceleration. operation means is not always necessary for attainment of the object of the present invention.

As described hereinbefore, according to the present invention, by making the smoothening characteristics of the aimed speed setting signal different from that of the running speed signal to be used for control purpose, the aimed speed setting signal can indicate substantially the same order of variation as that indicated on the vehicle speed meter and thus it is possible to run the vehicle at a constant speed the operator desired.

We claim:

1. A constant running speed control device for a vehicle having a speed meter, comprising:
   running speed detecting means (3) for detecting a running speed of the vehicle;
   first smoothing means (10), coupled to receive the output of said detecting means, for reducing a noise component of a running speed signal obtained by said running speed detecting means;
   instruction information detecting means (12) for detecting instruction information inputted by an operator of the vehicle, the inputted instruction information representing a desired constant running speed;
   second smoothing means (13) for receiving the output of said running speed detecting means, said second smoothing means having smoothing characteristics substantially similar to response characteristics of the speed meter for smoothing said running speed output;
   an aimed speed signal generator means (14) for generating an aimed speed signal Vr based on said smoothed running speed output from said second smoothing means and on said instruction information;
   speed deviation operating means (15) for obtaining a speed deviation based on said aimed speed signal and said smoothed running speed signal (Vs) from said first smoothing means;
   control amount operating means (16) for outputting a control signal based on said speed deviation signal; and
   driving force controlling means (7, 9) for controlling a driving force of the vehicle based on the control signal outputted by said control amount operating means.

2. The constant running speed control device as defined in claim 1, further comprising an accelerating operating means (11), coupled between said first smoothing means and said control amount operating means, for generating an acceleration signal representing an acceleration of the vehicle running speed signal, said control operating means outputting the control signal based on the speed deviation signal and the acceleration signal.

3. The constant running speed control device as defined in claim 1, wherein said driving force controlling means comprises a throttle valve driver (7) and a throttle valve (9), said throttle valve driver controlling a position of said throttle valve according to the control signal from said control amount operating means.

4. The constant running speed control device as defined in claim 1, wherein said first and second smoothing means are digital filters.

5. A constant running speed control system for a vehicle, the vehicle having a speed meter for displaying a running speed of the vehicle, the device comprising:
   running speed detecting means (3) for detecting the running speed of the vehicle;
   smoothing means (13) connected to receive the output of said running speed detecting means for smoothing said vehicle running speed, said smoothing means having smoothing characteristics which are substantially similar to response characteristics of the speed meter;
   instruction information detecting means (12) for detecting instruction information inputted by an operator of the vehicle, the instruction information representing a desired constant vehicle running speed;
   an aimed speed signal generating means (14), connected to receive the output of said instruction information detecting means and the smoothed running speed from said smoothing means, for generating an aimed running speed (Vr) representing the desired constant vehicle running speed;
   speed deviation operating means (15), coupled to said running speed detecting means and to said aimed speed signal generating means, for outputting a speed deviation signal ($\epsilon$) representing a difference between the detected vehicle running speed (V) and the aimed running speed;
   control amount operating means (16) for generating a control signal based on the speed deviation signal; and
   driving force controlling means (7, 9) for controlling a driving force of the vehicle based on said control signal so that the vehicle running speed becomes substantially equal to the aimed running speed.

6. The constant running speed control system as defined in claim 5, further comprising noise smoothing means (10) for reducing noise in the output of said running speed detecting means, said speed deviation operating means outputting a speed deviation signal representing a difference between the output of said noise smoothing means and the aimed running speed.

7. The constant running speed control system as defined in claim 5, further comprising an accelerating operating means (11), coupled between said smoothing means and said control amount operating means, for generating an accleration signal ($\alpha$) representing an acceleration of the vehicle running speed signal, said control operating means outputting the control signal based on the speed deviation signal and the acceleration signal.

8. The constant running speed control system as defined in claim 5, wherein said driving force controlling means comprises a throttle valve driver (7) and a throttle vale (9), said throttle valve driver controlling a position of said throttle valve according to the control signal from said control amount operating means.

9. The constant running speed control system as defined in claim 6, wherein said smoothing means and said noise smoothing means are digital filters.

* * * * *